US009898917B2

(12) United States Patent
Miller et al.

(10) Patent No.: US 9,898,917 B2
(45) Date of Patent: Feb. 20, 2018

(54) METHOD AND APPARATUS FOR PROVIDING ENVIRONMENTAL MANAGEMENT USING SMART ALARMS

(71) Applicant: VIGILENT CORPORATION, El Cerrito, CA (US)

(72) Inventors: Daniel N. Miller, El Cerrito, CA (US); Peter Varadi, El Cerrito, CA (US); Kennard White, El Cerrito, CA (US); Clifford Federspiel, El Cerrito, CA (US)

(73) Assignee: Vigilent Corporation, El Cerrito, CA (US)

( * ) Notice: Subject to any disclaimer, the term of this patent is extended or adjusted under 35 U.S.C. 154(b) by 0 days.

(21) Appl. No.: 14/435,358

(22) PCT Filed: Oct. 14, 2013

(86) PCT No.: PCT/US2013/064808
§ 371 (c)(1),
(2) Date: Apr. 13, 2015

(87) PCT Pub. No.: WO2014/062557
PCT Pub. Date: Apr. 24, 2014

(65) Prior Publication Data
US 2015/0279193 A1 Oct. 1, 2015

Related U.S. Application Data

(60) Provisional application No. 61/713,859, filed on Oct. 15, 2012.

(51) Int. Cl.
*G08B 21/18* (2006.01)
*G08B 31/00* (2006.01)
(Continued)

(52) U.S. Cl.
CPC .......... *G08B 21/182* (2013.01); *G08B 31/00* (2013.01); *G05B 23/0235* (2013.01); *G08B 21/18* (2013.01); *G08B 29/185* (2013.01)

(58) Field of Classification Search
CPC ............ G05B 23/0254; G05B 23/0297; G06F 17/5009; G06F 2217/04
See application file for complete search history.

(56) References Cited

U.S. PATENT DOCUMENTS 7,509,537 B1 3/2009 Jensen et al.
7,826,990 B2 11/2010 Nasle et al.
(Continued)

FOREIGN PATENT DOCUMENTS

JP 2004186445 2/2004
JP 2011-113411 A 6/2011
(Continued)

OTHER PUBLICATIONS

PCT Search Report and Written Opinion, PCT/US2013/064808, 10 pages, dated Oct. 14, 2013.
(Continued)

*Primary Examiner* — Sisay Yacob
(74) *Attorney, Agent, or Firm* — Moser Taboada

(57) ABSTRACT

The present invention is directed to methods and apparatuses for environmental management using a smart alarm comprising, receiving one or more readings from one or more sensors, wherein the sensors are of at least one or more distinct logical types, generating one or more derived points representing the one or more readings from the sensors and alerting one or more alarm units when the derived points satisfy an alarm condition.

20 Claims, 3 Drawing Sheets

(51) Int. Cl.
G05B 23/02 (2006.01)
G08B 29/18 (2006.01)

(56) References Cited

U.S. PATENT DOCUMENTS

| | | | |
|---|---|---|---|
| 2003/0014692 A1 | 1/2003 | James et al. | |
| 2003/0055607 A1* | 3/2003 | Wegerich | G07C 3/00 |
| | | | 702/188 |
| 2005/0251339 A1* | 11/2005 | Araki | G05B 23/0229 |
| | | | 702/2 |
| 2007/0192078 A1* | 8/2007 | Nasle | G05B 23/0254 |
| | | | 703/14 |
| 2010/0207762 A1 | 8/2010 | Lee et al. | |
| 2011/0202488 A1 | 8/2011 | Yuan | |
| 2011/0270797 A1 | 11/2011 | Adams et al. | |

FOREIGN PATENT DOCUMENTS

JP 2012088855 10/2012
KR 10-2011-0125047 11/2011

OTHER PUBLICATIONS

European Search Report for Application No. 13846943.2, dated Aug. 12, 2016, 7 pages.

\* cited by examiner

METHOD AND APPARATUS FOR PROVIDING ENVIRONMENTAL MANAGEMENT USING SMART ALARMS

BACKGROUND OF THE INVENTION

Field of the Invention

Embodiments of the present invention generally relate to environmental management of data centers and, more particularly, to a method and apparatus for providing environmental management using smart alarms.

Description of the Related Art

Typical environmental alarms are based on two types of alarm events: 1) level-crossing events such as temperature crossing above an alarm level, and 2) status alarms such as a mismatch between a binary command (e.g., "ON") and a status indicator providing binary feedback about whether or not the commanded unit has turned "ON". There are three problems with these types of alarms. The first is that for some systems, such as the cooling and temperature management system in a data center, there may be hundreds or thousands of the same logical sensor type or status indicators in the same managed space.

For example, in a typical 10,000 square foot data center, an environmental management system may have more than 200 sensor points, where most of them are rack inlet air temperature points measuring temperature at a particular cluster of sensors. Many sites with an environmental management system are up to 100,000 square feet with over a thousand sensor points and over one hundred cooling units each with status indicator sensor points. Upon a cooling failure event at a large site, hundreds of level-crossing (high-temperature) alarms and dozens of status alarms occur, flooding notification systems such as email and text messaging systems, making it difficult for operators to determine the extent and scope of a problem. Even in regular temperature conditions, the system has many sensors and indicators, significantly increasing the chances of false-alarms from a single sensor or indicator failure.

The second problem is that level-crossing alarms, such as high-temperature alarms, are a lagging indicator of a problem. For example, if a temperature sensor is high, then the elapsed time between the root-cause event of the high temperature condition and the alarm notification time is lost. In some applications, such as a cooling failure in a high-density data center, this lost time may force a service interruption that could have been prevented if the time between root cause and alarm notification had not been lost. Low level-crossing thresholds may be selected in order to preemptively compensate for this lost time, but low thresholds can result in false alarms.

In some instances, the time between root cause and level-crossing alarm notification can be avoided if an alarm is directly coupled to the root cause event. For example, if the root cause event is a cooling unit failure and if an alarm can be raised on the mismatch between the unit command and the unit status, then the status alarm can be a leading indicator of a high-temperature condition. However, this leads to the third problem, which is that not all status alarms indicate high-priority conditions, but some do. For data center cooling management this is because there is normally redundant cooling so that even if one unit or a small number of units fail, the temperature in the data center should remain under control. But sometimes a single unit failure can cause a severe problem due to lack of redundancy. For example, a partial failure of the cooling system may cause local temperatures in the data center to rise high enough to trip a fire suppression system, which may potentially shut down the remainder of the cooling units causing temperatures in the data center to exceed 130° F.

Therefore, there is a need in the art for improved environmental management alarms.

SUMMARY OF THE INVENTION

An apparatus and/or method for environmental management using a smart alarm comprising receiving one or more readings from one or more sensors, wherein the sensors are of at least one or more distinct logical types, generating one or more derived points representing the one or more readings from the sensors; and alerting one or more alarm units when the derived points satisfy an alarm condition.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
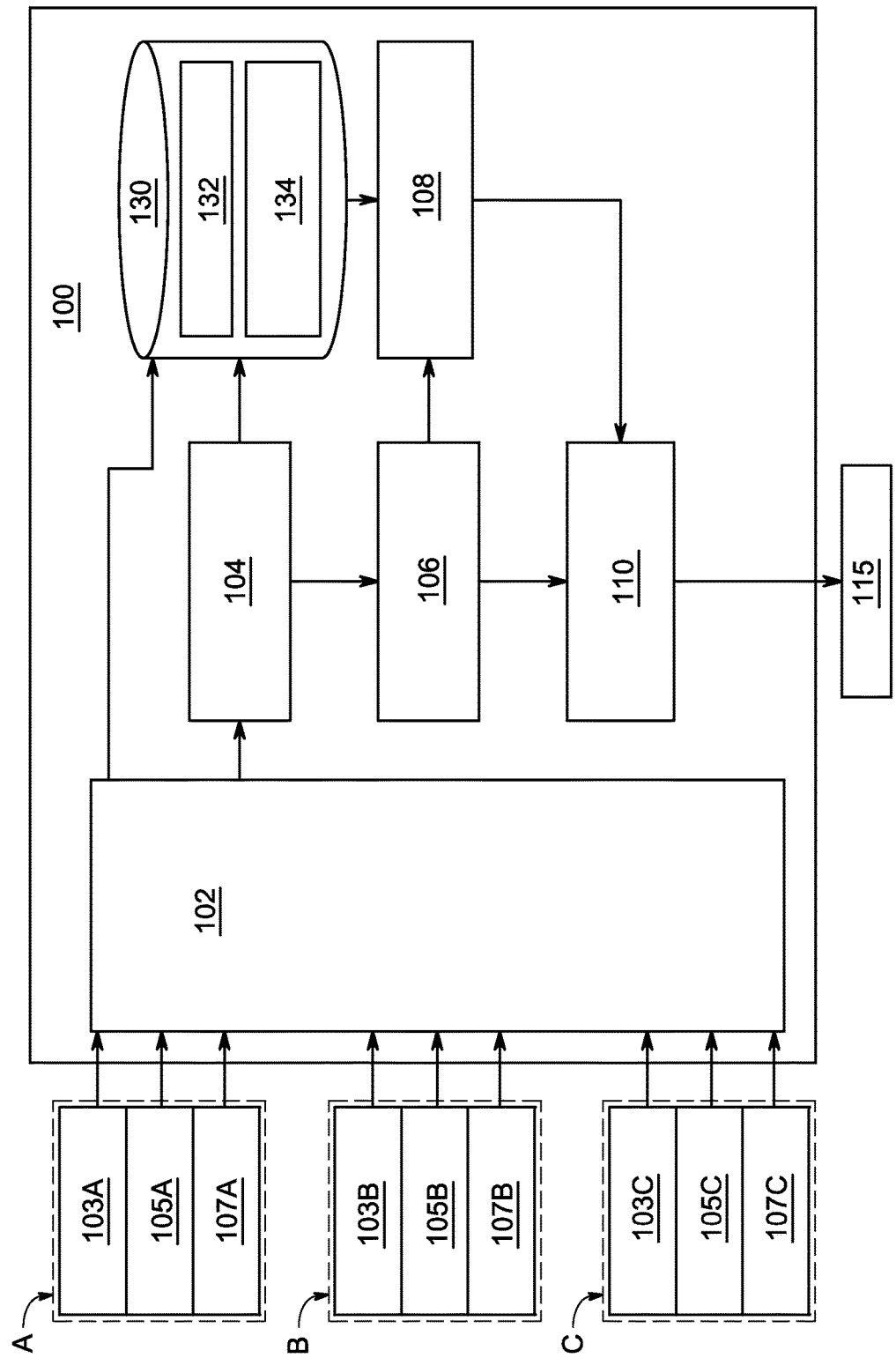
FIG. 1 depicts a functional block diagram of a smart alarm module for providing environmental management in accordance with at least one embodiment.

Embodiments of the present invention generally relate to environmental management using smart alarms. According to one embodiment, FIG. 1 depicts a functional block diagram of a smart alarm module 100 for providing environmental management in accordance with at least one embodiment. The smart alarm module 100 comprises a derived points module 102, a monitoring module 104, a statistical analysis module 106, an alert module 110 and a prediction module 108. The smart alarm module 100 further comprises a database 512 and various sensor groups A, B and C.

As an example, sensor group A comprises sensors 103A, 105A and 107A, where sensors 103A, 105A and 107A are, according to one embodiment, a particular logical type of sensors, for example, temperature sensors. The sensor groups A, B, C monitor equipment facilities, such as server rooms and the like, and measure environmental changes in the facility. Often the equipment housed in the facilities is computer servers which generate large amounts of heat and must remain below a particular temperature in order to operate at a functional capacity. In order to ensure that the equipment maintains a regular temperature, sensors such as 103-107 are used to monitor fluctuations and changes.

According to some embodiments, sensor groups A, B and C are distinct groups of types of sensors. In other embodiments, one or more of the sensor groups may have the same type of logical sensors and the remaining sensor groups have different logical types. According to an exemplary embodiment, sensor types comprise at least: rack inlet air temperature sensors, humidity sensors, return air temperature sensors, rack discharge air temperature sensors, floor differential pressure sensors, AHU discharge air temperature sensors, duct differential pressure sensors, power consumption monitor sensors, vibration sensors, gas and smoke sensors or the like. Optionally, the smart alarm module 100 can be located remote from the sensor groups A, B and C and the sensors upload data through a network to the smart alarm module 100. In other embodiment, the smart alarm module 100 can be located locally and coupled directly to the sensors via a wired and/or wireless communication network.

The smart alarm module 100 receives sensor readings from sensor groups A, B and C for the equipment and communicatively couples the readings to the derived points module 102. In a preferred embodiment, the derived points module 102 stores the raw sensor readings in 132 in the database 130. According to some embodiments, the readings are also stored in the database 130, or other similar storage medium, as derived point readings 134

The derived points module 102 generates one or more derived points that represent properties or aspects of raw sensor data or status data to be monitored in lieu of the raw sensor data. For example, the number (or fraction) of sensor points of the same logical type that exceed a high-temperature alarm level can be a derived point that represent the temperatures themselves as the monitored variable, as opposed to directly monitoring each temperature sensor. In this example, there may be one or more alarm levels for the number (or fraction) of temperatures that exceed the sensors group A's high-temperature alarm threshold.

For example, if there are 200 temperature sensors, there may be three alarm levels: a first alarm level for when 25 temperature sensors exceed a high temperature alarm level, a second alarm level for when 100 temperature sensors exceed a high temperature alarm level, and a third alarm level for when 150 temperature sensors exceed a high temperature alarm level. Accordingly, information about temperatures exceeding a threshold will be known when as little as 25 temperature sensors (in this example) detect a higher than normal temperature, providing a "leading" indication regarding an arising emergency. In the described example, there will be, for example, three derived points: derived point 1, indicating the status of 25 temperature sensors, derived point 2, indicating the status of 100 temperature sensors, and derived point 3, indicating the status of 150 temperature sensors. Alternatively, the derived points may be set as a fraction of the total of number of temperature sensors instead of a defined number of temperature sensors.

Other derived points could comprise other descriptive statistics or mathematical operations, performed by the coupled statistical analysis module 106 on sensor group B, such as the mode or the average of a collection of sensor readings in sensor group B, in addition to points constructed from a state estimator such as a Kalman filter and further derived points that represent these constructed points. A state estimator such as a Kalman filter uses a series of sensor readings to produce (in the case of Kalman filters, statistically optimal) estimates of unknown variables for which there may be no direct sensor readings in the system. They can also produce estimates of actual values of variables whose sensor readings are noisy when noise-induced spikes could trigger spurious alert conditions.

According to some embodiments, descriptive statistics that reflect the scale or shape of a distribution of sensor readings 132, instead of the location of the sensor groups A, B and C are used. Examples comprise the range and the difference between a location parameter, such as the mean or median, and extreme (high or low) quantiles, where quantiles are points taken at regular intervals from the estimated cumulative distribution function (CDF) of a random variable.

In other embodiments, other derived metrics replace sensor values for alarming. For example, cooling redundancy at each sensor location may be used as a derived point, after which the statistical analysis module 106 apples descriptive statistics to the derived points. If the statistics indicate an alarm should be set, the alert module 110 signals the alarm units 115 for alarming. A measure of cooling redundancy could be the number of cooling units that substantially affect a sensor location.

The prediction module 108 provides a predictive capability regarding the sensor groups A, B, and C and their future states. Predictions may be made using a transfer function, a lumped-parameter model, a Computational Fluid Dynamics type model, or any other predictive method. According to some embodiments, possible model types comprise lumped parameter (ODEs) or distributed parameter (PDEs), which may include continuous states, discrete states, or a combination of the two. Models may be generated analytically, computationally, or experimentally, and may include expressions of human knowledge of, or insights into, the behavior of a specific monitored facility (such as an expert system). The prediction module 108 uses logical models of cooling equipment, or other mathematical expressions of their behavior, to predict the impact of events such as cooling unit failures. If a unit or piece of equipment in a monitored facility has a status alarm indicating that cooling has failed, then the prediction module 108 determines a forward prediction based on this failure being persistent, and further based on any predetermined sequence of events that is known to follow such a failure. Such a predetermined sequence of events may comprise the start-up of a backup-system that exists to address such a failure. According to one embodiment, the backup system includes an electric generator or another chilled or cold-water source. A predetermined sequence of events also comprises, for example, specifications of how facility operators or other facility safety systems are supposed to react in the case of such an event. For example, if these specifications call for the operator to turn off heat load (e.g., heat generated by electronics) on one specific rack within a certain period of time, then a prediction could be made based on the assumption that the operator will indeed turn off the heat load on that rack at some specified time in the future, or, alternatively, on the assumption that the operator will not turn off the heat load.

In the prediction module 108, the predicted values of a derived point, such as the number or fraction of "exceedances" or threshold violations, is computed based on the predicted state of the sensor readings at one or more future points in time. The predicted state is determined, directly or indirectly, by previous and/or current sensor readings 130 and current and/or previous derived points 132 stored in the database 130 by the monitoring module 104. According to other embodiments, the predicted state may be factory or user configured. The predictive capability may comprise measures of confidence in the predicted states, which result in measures of confidence in the predicted value of a derived point. One example of such a measure is when the statistical analysis module 106 produces the statistical confidence interval that is based, in part, on the variability of past states of the system, but other measures are possible.

In another embodiment, the prediction module 108 predicts a time until a numerical or fractional count of derived points exceed a threshold (referred to as an "exceedance"), and then uses that predicted time as a monitored variable by the monitoring module 104, for level-crossing alarms. For example, if the individual temperature sensor point thresholds for 500 temperature points from 500 sensors are all 100° F., and if a low-priority fractional count is 1%, and if a time interval threshold is set at three (3) hours, then the alert module 110 will signal the low-priority exceedance count alarm when the prediction module 108 indicates that five (5) of the temperatures will exceed 100° F. in less than three (3) hours. In the context of confidence measures, the alert module 110 will signal the same alarm when the prediction module 108 indicates that five (5) of the temperatures will exceed 100° F. in less than three (3) hours, where the predicted indication has a confidence level that exceeds a selected confidence threshold.

Figure 2:
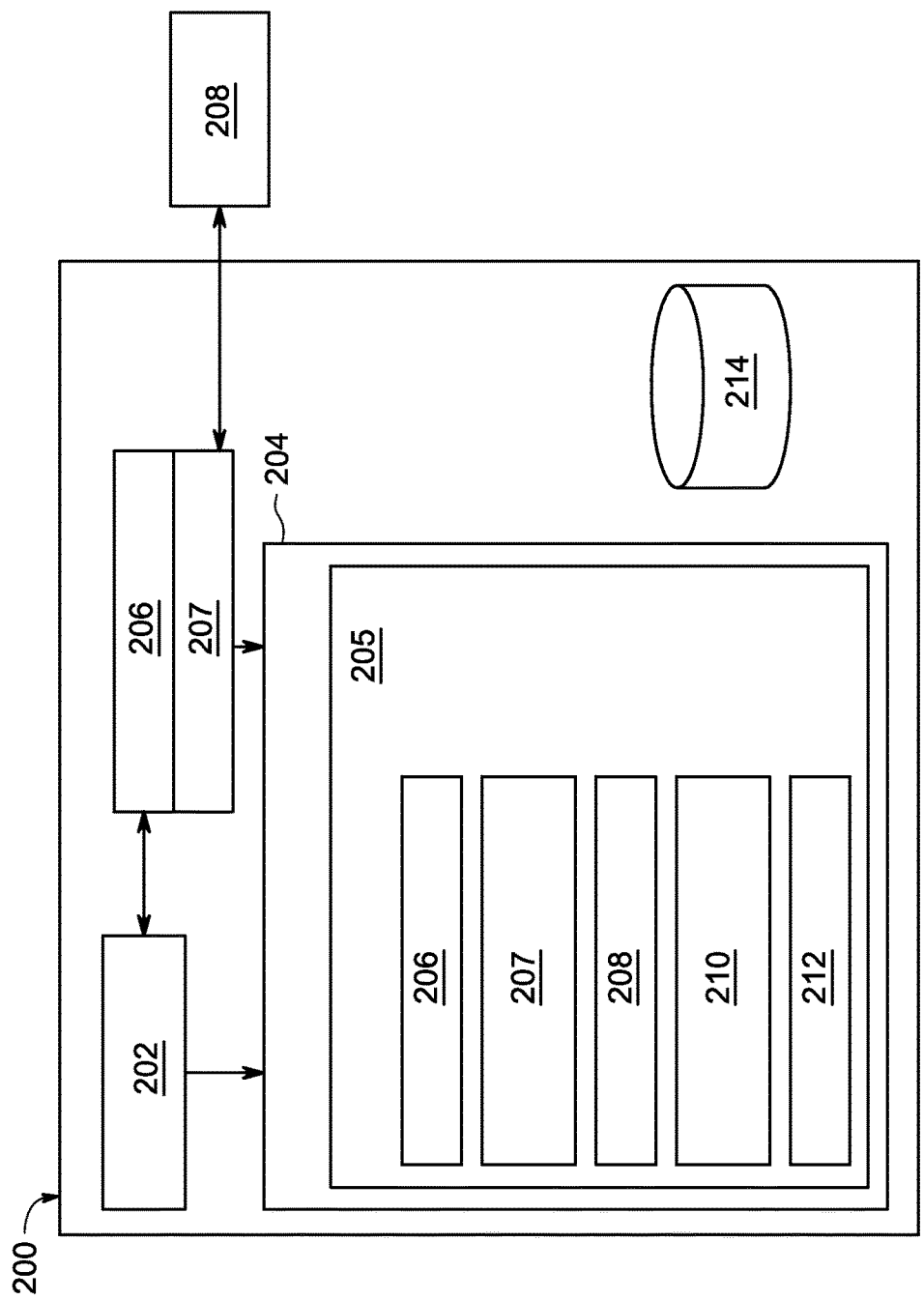
FIG. 2 depicts a block diagram of a computer system in accordance with at least one embodiment of the present invention.

FIG. 2 depicts a block diagram of a computer system in accordance with at least one embodiment of the present invention. In some embodiments, the alarm module 100 may be implemented using a one or more of such computers, for example a group of servers. The computer 200 may be used to implement the functionality of the smart alarm module 100 as the smart alarm module 205. The computer 200 includes a processor 202, various support circuits 206, and memory 204. The processor 202 may include one or more microprocessors known in the art. The support circuits 206 for the processor 202 include conventional cache, power supplies, clock circuits, data registers, I/O interface 207, and the like. The I/O interface 207 may be directly coupled to the memory 204 or coupled through the supporting circuits 206. The I/O interface 207 may also be configured for communication with input devices and/or output devices such as network devices, various storage devices, mouse, keyboard, display, and the like.

The memory 204, or computer readable medium, stores non-transient processor-executable instructions and/or data that may be executed by and/or used by the processor 202. These processor-executable instructions may comprise firmware, software, and the like, or some combination thereof. Modules having processor-executable instructions that are stored in the memory 204 comprise a smart alarm module 205, which further comprises a derived points module 207, a monitoring module 206, a prediction module 208, a statistical analysis module 210 and an alert module 212. The memory 204 also stores a database 212. The memory 204 may include one or more of the following random access memory, read only memory, magneto-resistive read/write memory, optical read/write memory, cache memory, magnetic read/write memory, and the like, as well as signal-bearing media as described below.

Figure 3:
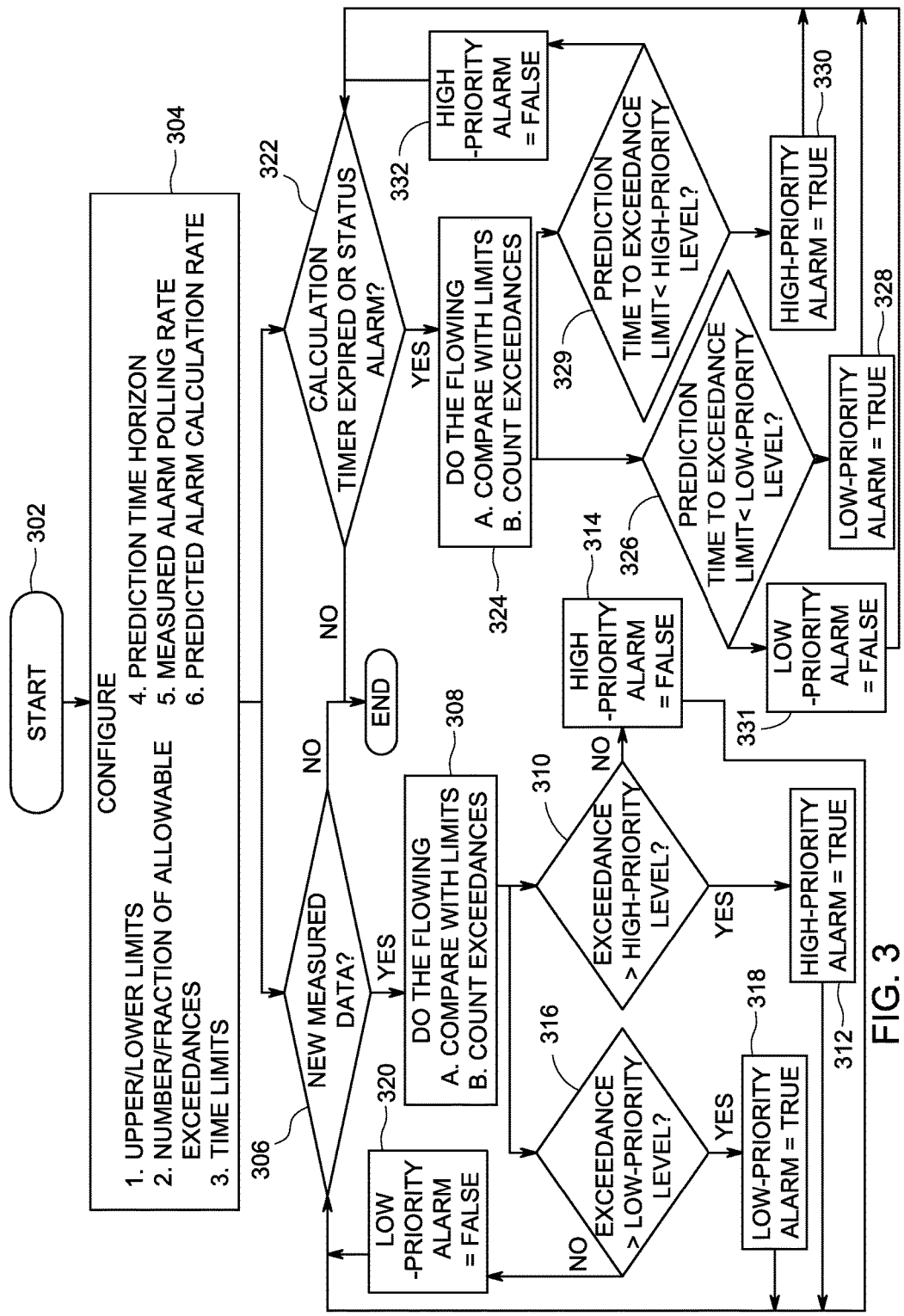
FIG. 3 depicts a flow diagram of a method for environmental management using a smart alarm in accordance with at least one embodiment of the present invention.

FIG. 3 depicts a flow diagram of a method 300 for environmental management using smart alarms in accordance with at least one embodiment of the present invention. The method 300 represents the execution of the smart alarm module 100 implemented as the smart alarm module 205, stored in memory 204 and executed by processor 202. The method 300 begins at step 302 and proceeds to step 304.

At step 304, the method smart alarm module 205 configures upper and lower limits of the various sensors located in an equipment housing facility currently being monitored. The smart alarm module 205 also configures for each sensor, or for each derived point, the number or fraction of allowable exceedances, i.e., the number of sensors that can go above or below, respectively, the upper and lower limit previously configured. Time limits for exceedances are also initiated optionally along with a prediction time horizon (i.e., a limit on how far into the future a prediction is made). The smart alarm module 205 further configures an initial polling rate for each sensor or measured alarm and the rate or conditions at which alarm predictions will be made.

According to some embodiments, the method 300 branches after step 304 and performs steps 306 and 322, and their subsequent steps substantially in parallel. At step 306, the monitoring module 206 determines whether there is newly measured data. If there is no newly measured data, the method ends at step 350. If newly measured data is available to the monitoring module 206, the monitoring module 206 compares the data with limits set on the sensors or the derived points at step 308.

The monitoring module 206 further counts the number of exceedances of the limits initially set, by the sensors. At step 310, the monitoring module 206 determines whether the count of exceedances is greater than a high-priority level (a predetermined value), and if the count is not greater, then the monitoring module 206 signals to the alert module 212 that there is no high priority alarm at step 314 and the method returns to step 306. If the count of exceedances exceeds the high priority value, the monitoring module 206 signals the alert module 212 to initiate the alarm units 115 signifying a high priority event has occurred at step 312.

Similarly, if the exceedance count is greater than a low priority level (yet lower than the high priority level) at step 316, the monitoring module 206 signals the alert module 212 to initiate the alarm units 115 signifying a low priority event has occurred at step 318. If the exceedances do not exceed the low-priority level then the monitoring module 206 signals to the alert module 212 that there is no low priority alarm at step 320 and the method returns to step 306.

According to other embodiments of the present invention, the monitoring module 206 may signal the alert module 212 to initiate the alarm units 115 when any number of exceedances is observed. For example, a medium priority level may be met and the alarm units 115 are signaled accordingly. In the general case, the derived point exceedances can be monitored for N levels of exceedances corresponding to N priority levels.

At parallel step 322, the monitoring module 206 determines whether the calculation timer has expired, or a status alarm has been reported. If neither of these is true, the method ends at step 350. If either the calculation time is expired or a status alarm has been reported, the method 300 proceeds to step 324, where the predicted time (as predicted by the prediction module 208) is compared with limits and the number of exceedances is counted.

At step 326, the monitoring module 206 determines whether the predicted time to exceedance limit is less than a low priority level. If it is determined that the predicted time to exceedance limit is less than the low priority level, the monitoring module 206 signals the alert module 212 that there is a low-priority alarm that must propagate to the alarm units 115 at step 328. If it is determined that the predicted time to exceedance limit is not less than the low priority level, the monitoring module 206 signals the alert module 212 that there is no low-priority alarm to propagate to the alarm units 115 at step 331, and the method returns to step 322.

At step 329, the monitoring module 206 determines whether the predicted time to exceedance limit is less than a high priority level. If it is determined that the predicted time to exceedance limit is less than the high priority level, the monitoring module 206 signals the alert module 110 that there is a high-priority alarm that must propagate to the alarm units 115 at step 330. If it is determined that the predicted time to exceedance limit is not less than the high priority level, the monitoring module 206 signals the alert module 212 that there is no high-priority alarm to propagate to the alarm units 115 at step 332, and the method returns to step 322. The method terminates at step 350 after there is no more measurement data, and the calculation timer has expired or there are no status alarms.

Various elements, devices, modules and circuits are described above in association with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A method for environmental management using a smart alarm comprising:
receiving one or more readings from one or more sensors, wherein the sensors are of at least one or more distinct logical types;
generating one or more derived points representing collective calculations based on the one or more readings from the sensors, each derived point corresponding to one of the one or more distinct logical types, wherein the collective calculations represent descriptive statistics that reflect shape of a distribution of the one or more readings;
determining a prediction of satisfaction of an alarm condition for the one or more sensors based on a model of the one or more sensors;
generating a set of derived points based on the prediction at one or more future points in time; and
alerting one or more alarm units when the derived points satisfy the alarm condition in order to provide leading identifications of alarm conditions.

2. The method of claim 1, further comprising:
determining the prediction based on a predicted state of the one or more sensors, wherein the predicted state is determined by previous and/or current sensor readings from the one or more sensors.

3. The method of claim 2, further comprising:
comparing a number of exceedances with one or more priority levels of alarms to determine whether to alert the one or more alarm units, wherein an exceedance is a threshold violation of a particular alarm condition.

4. The method of claim 2, further comprising:
determining the prediction using one or more of a transfer function, lumped parameter model and a computational fluid dynamics type model.

5. The method of claim 2, further comprising:
generating the model based on one or more of computational or experiential data regarding behavior of the one or more sensors.

6. The method of claim 5, further comprising:
generating the model further based on a predetermined sequence of events known to lead to failure of the one or more sensors, wherein the predetermined sequence of events also incorporate operational safety reactions in a facility.

7. The method of claim 5, wherein generating the model further comprises:
determining measures of confidence in the predicted state, resulting in measures of confidence in the prediction of satisfaction of the alarm condition.

8. The method of claim 7, wherein measures of confidence comprise a statistical confidence interval based on variability of past states of the one or more sensors.

9. The method of claim 2, wherein the prediction of satisfaction indicates a time until a numerical or fractional count of the one or more derived points exceeds a threshold value; and
monitoring the one or more sensors based on the time indicated.

10. The method of claim 1, wherein the shape of the distribution comprise one or more of range and difference between a location parameter, and extreme quantiles.

11. The method of claim 10, wherein the extreme quantiles are points taken at regular intervals from estimated cumulative distribution functions of random variables.

12. An apparatus for environmental management using a smart alarm comprising:
a derived points module, coupled to one or more sensors, that receives one or more readings from the one or more sensors, wherein the one or more sensors are of at least one or more distinct logical types and the derived points module generates one or more derived points representing collective calculations based on the one or more readings from the one or more sensors, each derived point corresponding to one of the one or more distinct logical types, wherein the collective calculations represent descriptive statistics that reflect shape of a distribution of the one or more readings;
a prediction module that determines a prediction of satisfaction of an alarm condition for the one or more sensors based on a model of the one or more sensors, wherein the derived points module generates a set of derived points based on the prediction at one or more future points in time; and
an alert module alerting one or more alarm units when the derived points satisfy the alarm condition in order to provide leading identifications of alarm conditions.

13. The apparatus of claim 12, wherein the prediction module determines the prediction based on a predicted state of the one or more sensors, wherein the predicted state is determined by previous and/or current sensor readings from the one or more sensors.

14. The apparatus of claim 13, wherein the prediction module further compares a number of exceedances with one or more priority levels of alarms to determine whether to alert the one or more alarm units, wherein an exceedance is a threshold violation of a particular alarm condition.

15. The apparatus of claim 13, wherein the prediction module determines the prediction using one or more of a transfer function, lumped parameter model and a computational fluid dynamics type model.

16. A method for environmental management using a smart alarm comprising:
receiving a plurality of readings for each of a plurality of sensors, wherein the sensors are of at least one or more distinct logical types;
generating a first derived point based on readings from a first portion of the plurality of sensors of a first distinct logical type;

generating a second derived point based on readings from a second portion of the plurality of sensors of the first distinct logical type, wherein the second portion also contains the first portion of the plurality of sensors;

generating a third derived point based on readings from a third portion of the plurality of sensors of the first distinct logical type, wherein the third portion also contains the second portion of the plurality of sensors;

alerting one or more alarm units when the first derived point exceeds a threshold to provide leading identifications of alarm conditions; and alerting the one or more alarm units when the second derived point and third derived point exceed respective threshold in order to provide gradually increased alarm levels.

17. The method of claim 16, wherein the first derived point, the second derived point and the third derived point are based on a shape of a distribution of the plurality of readings, wherein the shape of the distribution comprises one or more of range and difference between a location parameter, and extreme quantiles.

18. The method of claim 16, further comprising:
determining a prediction based on a predicted state of the plurality of sensors, wherein the predicted state is determined by previous and/or current sensor readings from the plurality of sensors.

19. A method for environmental management using a smart alarm comprising:
receiving one or more readings from one or more sensors, wherein the one or more sensors are of at least one or more distinct logical types;

generating one or more derived points representing collective calculations based on the one or more readings from the one or more sensors, each derived point corresponding to one of the one or more distinct logical types;

alerting one or more alarm units when the derived points satisfy an alarm condition in order to provide leading identifications of alarm conditions;

determining a prediction of satisfaction of the alarm conditions for the one or more sensors based on a model of the one or more sensors; and generating another set of derived points based on the prediction at one or more future points in time.

20. The method of claim 19, further comprising:
determining the prediction based on a predicted state of the one or more sensors, wherein the predicted state is determined by previous and/or current sensor readings from the one or more sensors.

* * * * *